US011783267B2

(12) United States Patent
Kulkarni et al.

(10) Patent No.: US 11,783,267 B2
(45) Date of Patent: *Oct. 10, 2023

(54) AUTOMATED MULTI-CHANNEL CUSTOMER JOURNEY TESTING

(71) Applicant: Cyara Solutions Pty Ltd, Hawthorn (AU)

(72) Inventors: Alok Kulkarni, Glen Iris (AU); Geoff Willshire, Greenslopes (AU)

(73) Assignee: CYARA SOLUTIONS PTY LTD

( * ) Notice: Subject to any disclaimer, the term of this patent is extended or adjusted under 35 U.S.C. 154(b) by 178 days.

This patent is subject to a terminal disclaimer.

(21) Appl. No.: 17/317,536

(22) Filed: May 11, 2021

(65) Prior Publication Data

US 2021/0304106 A1 Sep. 30, 2021

Related U.S. Application Data

(63) Continuation of application No. 16/189,811, filed on Nov. 13, 2018, now Pat. No. 11,010,704, which is a
(Continued)

(51) Int. Cl.
G06Q 10/00 (2023.01)
G06F 16/00 (2019.01)
(Continued)

(52) U.S. Cl.
CPC ... G06Q 10/06395 (2013.01); G06F 16/1734 (2019.01); G06F 16/1865 (2019.01);
(Continued)

(58) Field of Classification Search
CPC ....... G06Q 10/06395; G06Q 10/06316; G06Q 10/10; G06Q 10/04; G06Q 10/06;
(Continued)

(56) References Cited

U.S. PATENT DOCUMENTS 8,660,590 B2 * 2/2014 Karnam Holal ...... H04L 51/216
  455/414.1
8,831,978 B2 * 9/2014 Patel ..................... G06Q 30/02
  705/7.29
(Continued)

FOREIGN PATENT DOCUMENTS

EP 2597573 B1 * 8/2018
WO WO2000017793 A1 * 3/2000
(Continued)

OTHER PUBLICATIONS

Xiong Yuanbin et al., "Research on Customer Relation Management in e-Commerce Environment", International Conference on Management and Service Science (pp. 1-3), Aug. 2011.*
(Continued)

Primary Examiner — Srirama Channavajjala
(74) Attorney, Agent, or Firm — Galvin Patent Law LLC; Brian R. Galvin; Brian S. Boon

(57) ABSTRACT

A system and method for automated multi-channel customer journey testing, that links communication channels and follows a customer interaction across multiple channels as a single journey, incorporating data and interaction content from each channel utilized to maintain a "big picture" view of a customer's journey across these channels during an interaction. The invention also provides flexible success indicators to accommodate virtual assistant and chat bot programs, by accommodating variances in expected test results such as to handle natural language variance, time of day, context, and other factors that may cause variances in interaction content.

9 Claims, 7 Drawing Sheets

Related U.S. Application Data continuation of application No. 15/632,369, filed on Jun. 25, 2017, now Pat. No. 10,127,513.

(60) Provisional application No. 62/491,256, filed on Apr. 28, 2017.

(51) Int. Cl.

| | |
|---|---|
| *G06Q 10/0639* | (2023.01) |
| *H04L 51/02* | (2022.01) |
| *G06Q 30/016* | (2023.01) |
| *H04W 88/16* | (2009.01) |
| *H04W 4/14* | (2009.01) |
| *G06Q 10/0631* | (2023.01) |
| *G06Q 10/10* | (2023.01) |
| *H04L 51/23* | (2022.01) |
| *G06F 16/17* | (2019.01) |
| *G06F 16/683* | (2019.01) |
| *G06F 16/18* | (2019.01) |
| *H04L 67/50* | (2022.01) |

(52) U.S. Cl.
CPC ..... *G06F 16/685* (2019.01); *G06Q 10/06316* (2013.01); *G06Q 10/10* (2013.01); *G06Q 30/016* (2013.01); *H04L 51/02* (2013.01); *H04L 51/23* (2022.05); *H04W 4/14* (2013.01); *H04W 88/16* (2013.01); *H04L 67/535* (2022.05)

(58) Field of Classification Search
CPC ............. G06Q 30/016; G06Q 30/0643; G06Q 30/0633; G06Q 30/0601; G06Q 30/06; G06Q 30/0641; G06Q 30/02; G06Q 30/0283; G06Q 50/01; G06F 16/1734; G06F 16/176; G06F 16/188; G06F 16/1865; G06F 16/183; G06F 16/1837; G06F 16/28; G06F 16/26; G06F 16/7834; G06F 16/685
See application file for complete search history.

(56) References Cited

U.S. PATENT DOCUMENTS

| | | | | |
|---|---|---|---|---|
| 10,127,513 | B1* | 11/2018 | Kulkarni | H04L 51/23 |
| 11,010,704 | B2* | 5/2021 | Kulkarni | G06Q 10/06316 |
| 11,050,786 | B2* | 6/2021 | Be'ery | H04L 63/1458 |
| 2003/0229884 | A1* | 12/2003 | Carr | G06F 16/2465 |
| | | | | 717/101 |
| 2004/0008825 | A1 | 1/2004 | Seeley et al. | |
| 2005/0144642 | A1* | 6/2005 | Ratterman | H04N 21/4882 |
| | | | | 348/E7.071 |
| 2008/0320071 | A1* | 12/2008 | Hoskins | G06F 11/3688 |
| | | | | 709/202 |
| 2009/0172035 | A1* | 7/2009 | Lessing | G06Q 30/02 |
| 2010/0223104 | A1* | 9/2010 | Patel | G06Q 30/0283 |
| | | | | 707/723 |
| 2011/0054977 | A1* | 3/2011 | Jaffer | G06Q 10/06 |
| | | | | 706/50 |
| 2011/0150189 | A1 | 6/2011 | Kulkarni | |
| 2012/0072358 | A1* | 3/2012 | Famous | G06Q 50/01 |
| | | | | 705/319 |
| 2012/0209781 | A1* | 8/2012 | Michaelis | G06Q 30/02 |
| | | | | 705/304 |
| 2013/0246853 | A1 | 9/2013 | Salame | |
| 2013/0262598 | A1* | 10/2013 | Makanawala | G06Q 50/01 |
| | | | | 709/206 |
| 2014/0180788 | A1 | 6/2014 | George et al. | |
| 2015/0154524 | A1* | 6/2015 | Borodow | H04W 4/029 |
| | | | | 705/7.23 |
| 2015/0242792 | A1* | 8/2015 | Parandker | G06Q 10/06395 |
| | | | | 705/7.32 |
| 2016/0036982 | A1* | 2/2016 | Ristock | G06Q 10/04 |
| | | | | 379/265.1 |
| 2016/0072916 | A1* | 3/2016 | Milbury, Jr. | H04L 67/306 |
| | | | | 709/217 |
| 2016/0196561 | A1* | 7/2016 | Iyer | G06Q 50/01 |
| | | | | 705/304 |
| 2016/0328434 | A1* | 11/2016 | Barbas | G06F 16/21 |
| 2017/0046717 | A1* | 2/2017 | Davi | G06F 16/29 |
| 2018/0007102 | A1* | 1/2018 | Klein | H04L 65/65 |

FOREIGN PATENT DOCUMENTS

| | | | |
|---|---|---|---|
| WO | WO2002039331 | A2 * | 5/2002 |
| WO | WO 2005067476 | A2 * | 7/2005 |
| WO | WO2005086059 | A1 * | 9/2005 |
| WO | WO2009007410 | A2 * | 1/2009 |
| WO | WO2009064775 | A1 * | 5/2009 |

OTHER PUBLICATIONS

Nassim Laga et al., "Communication-Based Business Process Task Detection—Application in the CRM Context", IEEE 20th International Enterprise Distributed Object Computing Workshop (EDOCW) (pp. 1-8), Oct. 2016.*

J. Gwin et al., "Historical data modeling determines future collection criteria", 1997 IEEE/SEMI Advanced Semiconductor Manufacturing Conference and Workshop ASMC 97 Proceedings, Sep. 1997, pp. 20-23.*

Yuanbin Xiong et al., "Research on Customer Relation Management in e-Commerce Environment", 2011 International Conference on Management and Service Science, Aug. 2011, pp. 1-3.*

* cited by examiner

AUTOMATED MULTI-CHANNEL CUSTOMER JOURNEY TESTING

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/189,811
Ser. No. 15/632,369
62/491,256

BACKGROUND OF THE INVENTION

Field of the Art

The disclosure relates to the field of contact center operations, and more particularly to the field of testing methods for multi-channel communication systems.

Discussion of the State of the Art

In the field of contact center operations, there is a shift toward multi-channel interactions that may use multiple different communication methods as part of a single customer experience or "journey", such as voice chat with a contact center agent while a customer is browsing a website on their computer, or combining voice and text chat to continue an interaction in-progress while switching communication methods, or other multi-channel use cases. There is also an increase in the use of virtual assistants and chat bots to assist customers when human agents are unavailable or unnecessary.

What is needed, is an automated testing solution that can test interactions across multiple communication channels, that can link channels to follow a customer journey for testing as a whole, and that supports flexible success indicators to accommodate virtual assistants and chat bot programs.

SUMMARY OF THE INVENTION

Accordingly, the inventor has conceived and reduced to practice, in a preferred embodiment of the invention, a system and method for automated multi-channel customer journey testing.

The invention comprises a system that links communication channels and follows a customer interaction across multiple channels as a single journey, incorporating data and interaction content from each channel utilized to maintain a "big picture" view of a customer's journey across these channels during an interaction. The invention also provides flexible success indicators to accommodate virtual assistant and chat bot programs, by accommodating variances in expected test results such as to handle natural language variance, time of day, context, and other factors that may cause variances in interaction content.

According to a preferred embodiment of the invention, a system for automated multi-channel customer journey testing, a system for automated multi-channel customer journey testing, comprising: a test database configured to store and provide testing information, the testing information comprising at least a test configuration, each test case configuration comprising at least a plurality of test success criteria and an execution configuration; a test case management server configured to retrieve testing information from the test database and compare at least a plurality of received communication messages against at least a portion of the test success criteria of a test case configuration; a journey tracking server configured to receive communication messages from a plurality of communication channels, and configured to analyze at least a portion of the received communication messages to identify similarities between messages, and configured to produce a plurality of logical associations between messages to identify a customer journey that comprises a plurality of individual communications; and a journey testing server configured to transmit communication messages via a plurality of communication channels based at least in part on a loaded test case configuration, is disclosed.

According to another preferred embodiment of the invention, a method for automated multi-channel customer journey testing, a method for automated multi-channel customer journey testing, comprising the steps of: transmitting, using a journey testing server configured to transmit communication messages via a plurality of communication channels based at least in part on a loaded test case configuration, a communication message via a communication channel, wherein the communication channel is one of an email server, CTI server, web server, or SMS gateway; receiving, at a journey tracking server configured to receive communication messages from a plurality of communication channels, and configured to analyze at least a portion of the received communication messages to identify similarities between messages, and configured to produce a plurality of logical associations between messages to identify a customer journey that comprises a plurality of individual communications, the communication message; analyzing the content of the communication message using at least a plurality of text analysis techniques; associating the communication message with a customer journey based at least in part on the analysis results; comparing, using a test case management server configured to retrieve testing information from the test database and compare at least a plurality of received communication messages against at least a portion of the test success criteria of a test case configuration, at least a portion of the analysis results against a test case configuration; and determining the success or failure of the test based at least in part on the comparison results, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
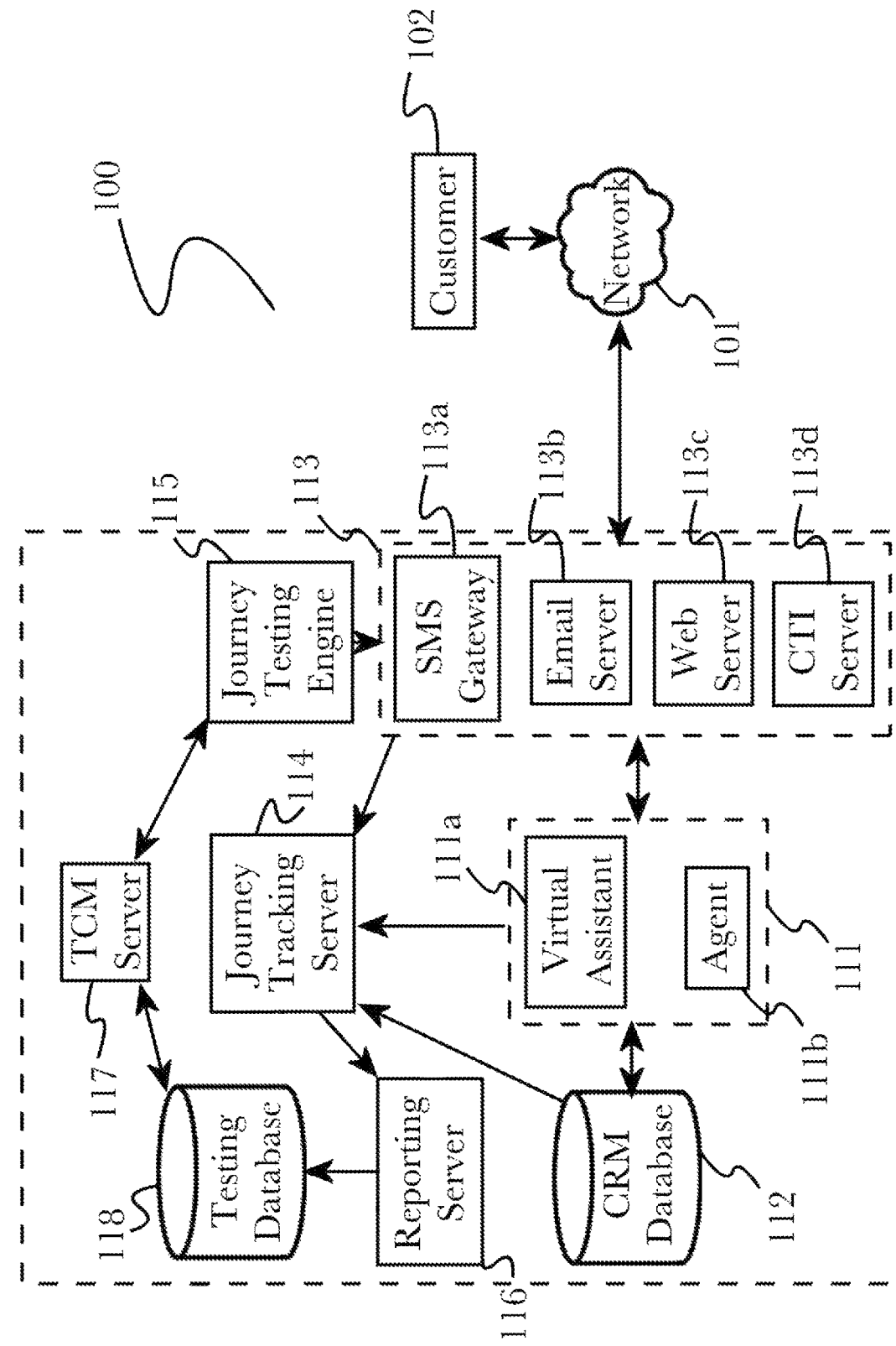
FIG. 1 is a block diagram illustrating an exemplary system architecture for automated multi-channel customer journey testing, according to a preferred embodiment of the invention.

The inventor has conceived, and reduced to practice, in a preferred embodiment of the invention, a system and method for automated SMS regression and functional testing.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for automated multi-channel customer journey testing, according to a preferred embodiment of the invention. According to the embodiment, a customer journey testing system 110 may comprise a customer relations management (CRM) database 112 that stores and provides custom information such as account details or historical interactions, a plurality of contact endpoints 111 such as virtual assistant (VA) software programs 111a and contact center agents 111b, and a plurality of communication channels 113 such as (for example, including but not limited to) a short message service (SMS) gateway 113a to send and receive SMS-based text messages, email server 113b to send and receive email messages, web server 113c to provide and handle interactive web-accessible interfaces such as websites or IP-based chat, and computer telephony integration (CTI) server 113d to communicate via telephone networks. These and other communication interfaces, and various combinations thereof, may be used to send and receive communications with a plurality of customers 102 via a variety of networks 101, for example to receive phone calls from a customer 102 via a public switched telephone network (PSTN) 101, or to send email messages to a customer 102 via the Internet 101, or other various arrangements and use cases. VA 111a may interact with customer 102 in place of a human agent 111b, for example to provide automated chat communication when agents are unavailable, or to provide responses to customer queries outside of business hours, or other uses. Interaction information may be read from and stored in CRM database 112, allowing VAs 111a and agents 111b to review historical data such as previous interactions with a particular customer 102 or to retrieve a customer's account information, as well as to update information and store details of a current interaction.

To provide customer journey testing, a journey tracking server 114 may be used to monitor information in CRM database 112 as well as to track interactions by monitoring VA 111a and agent 111b activities and maintaining connections to a plurality of communication channels 113. This enables journey tracking server 114 to monitor interactions regardless of the communication method or endpoint used, and provides access to historical data in CRM database 112. This information may be used by journey tracking server 114 to analyze interaction information, identifying connections between discrete portions of data such as (for example) identifying a customer and retrieving that customer's historical interaction details, or identifying topics or issues within an interaction and comparing those to recent or ongoing interactions to determine any connections. For example, a customer 102 may begin a chat session with a VA 111a via SMS gateway 113a, while simultaneously browsing self-service information on a company's website via web server 113c. Journey tracking server 114 may identify the connection between these two seemingly discrete interactions, and connect them to form a logical journey the customer 102 is involved in, wherein they are both chatting with the VA 111a and browsing the website, allowing the information from each separate interaction to be analyzed and handled as a single, larger interaction encompassing all ongoing activity with this customer. This enables analysis of customer interactions across communication channels and endpoints, bridging services to form a more complete representation of interactions.

Using the customer journey tracking capabilities provided by journey tracking server 114, it then becomes possible to provide automated testing across communication channels and endpoints, enabling testing of customer journeys as complete interactions that may comprise multiple communications, such as chat messages, phone calls, and emails. A test case management (TCM) server 117 may load a stored test case configuration from a testing database 118, and may then direct a journey testing engine 115 to execute various operations according to the test case configuration such as (for example, including but not limited to) generating and sending messages via a plurality of communication channels such as SMS text messages via SMS gateway 113a or email messages via email server 113b, or listening for response messages from contact endpoints 111 such as automated responses from a VA program 111a, and then analyzing those responses. For example, a test may comprise sending a plurality of email messages via email server 113b, listening for a response from VA 111a, analyzing the response, and determining the success state of the test based on the analysis results. For example, a generated test email may comprise a query regarding account information, and a response (if received) may then be analyzed to determine whether the correct information was provided, and based on the information provided in the response the test may be considered a success or failure. Additionally, using natural language recognition during analysis, it is possible to accept a variety of responses as "success conditions", rather than requiring a response to adhere to a particular structure or vocabulary. This may be used to accommodate more advanced VA responses (as VA programs in the art continue to advance in terms of natural interaction capabilities), or to accept responses from human agents. This can also be used to accommodate, and optionally test for, a range of potential minor errors in a response such as typographical errors or word substitution (that is, using the incorrect term for something, as may occur in a response from a human agent). For example, a test may examine whether a VA is producing an unacceptable frequency of typographical errors, or whether a human agent is using incorrect vocabulary when communicating with customers (as may indicate unfamiliarity or a need for additional training). A reporting server 116 may be used to monitor test case execution and produce reports from execution results, for example including email message fields (such as sender address, recipient addresses, header, body, and other email data fields), test case execution time (for example, tracking min/max time thresholds during test execution), what communication systems were tested, or other data that may be useful for future review. Test case reports may be stored in testing database 118 for future reference.

Detailed Description of Exemplary Embodiments

Figure 2:
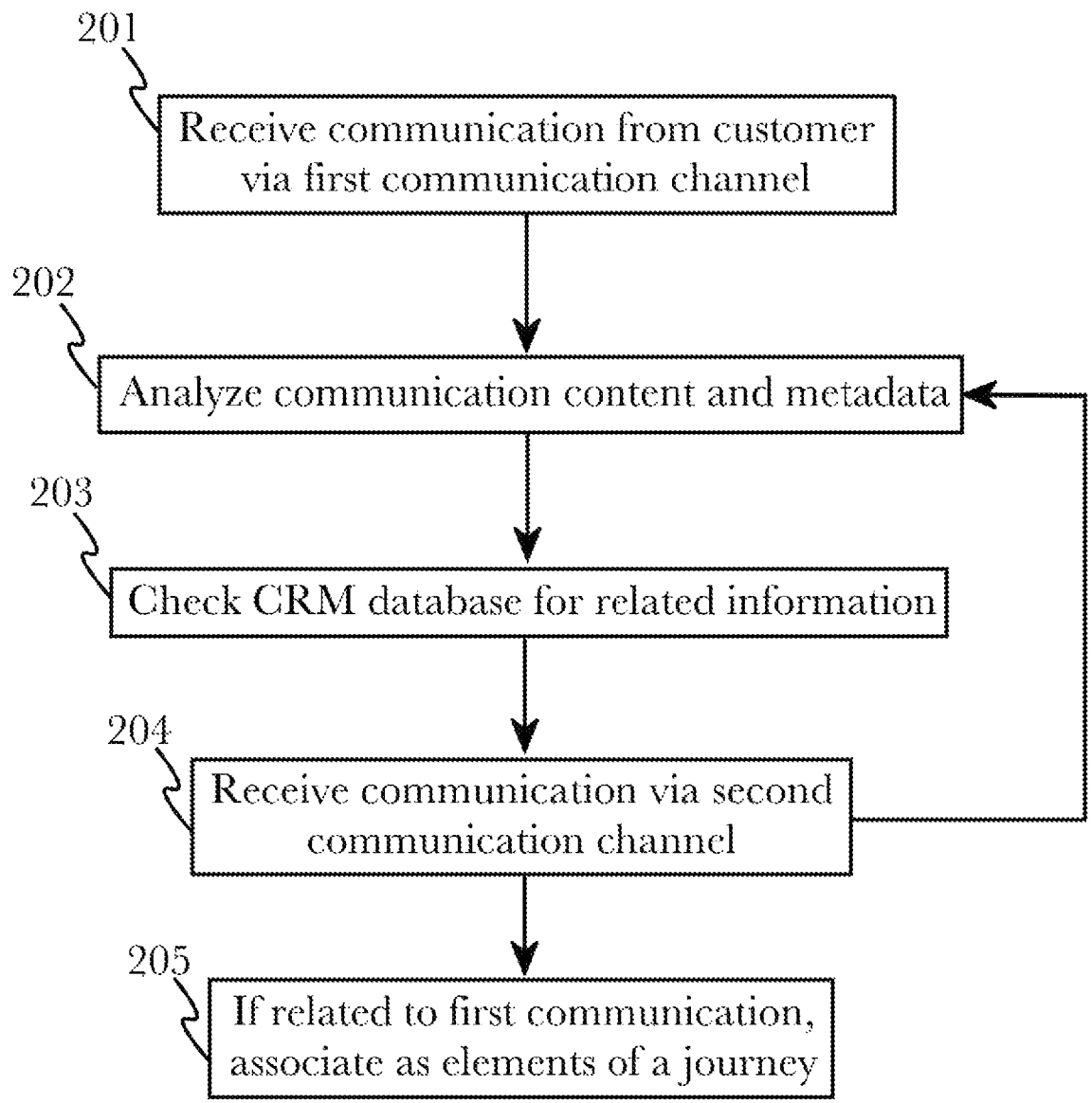
FIG. 2 is a flow diagram illustrating an exemplary method for automated multi-channel customer journey testing, illustrating a process for following a customer journey across multiple communication channels, according to a preferred embodiment of the invention.

FIG. 2 is a flow diagram illustrating an exemplary method 200 for automated multi-channel customer journey testing, illustrating a process for following a customer journey across multiple communication channels, according to a preferred embodiment of the invention. In an initial step 201, a journey tracking server 114 may receive communication from a customer via a first communication channel 113, such as an inbound telephone call or email, or any other communication type. In a next step 202 journey tracking server 114 may analyze the content (for example, the body text of an email or the conversation audio of a phone call) of the communication, as well as any available metadata such as source address (for example, a customer's phone number, email address, IP address, or other information identifying the source of the communication), timing information such as when the communication was placed or received, or information about a customer's device or the communication channel used such as IP addresses of email servers, hardware capabilities or SIM ID of a customer's mobile phone, customer geolocation information, or any other metadata that may be associated with or inferred from the communication received. In a next step 203, a CRM database 112 may be checked for related information based on the analysis, for example to retrieve a customer's account information or records of past interactions, and this retrieved data may be further analyzed to identify any additional information such as agents with whom the customer has interacted more than once, reports of recurring issues, customer preference as to communication channels, or other such insights.

When another communication is received via a second communication channel 204, whether it was inbound or outbound (that is, a response from a contact center agent 111b or a VA program 111a), this new communication may be analyzed 202 and used to look up additional information 203 in a CRM database 112. Operation may continue in this manner iteratively, performing data lookups and analyzing communications each time they are received. If it is determined that a new communication is related to the first communication (for example, through analysis and lookup operations that identify significant similarities between two communications), a logical association may be formed between the two communications in a final step 205, enabling them to be handled as a single customer journey that may span multiple interactions, communication channels, VA programs or human agents.

Figure 3:
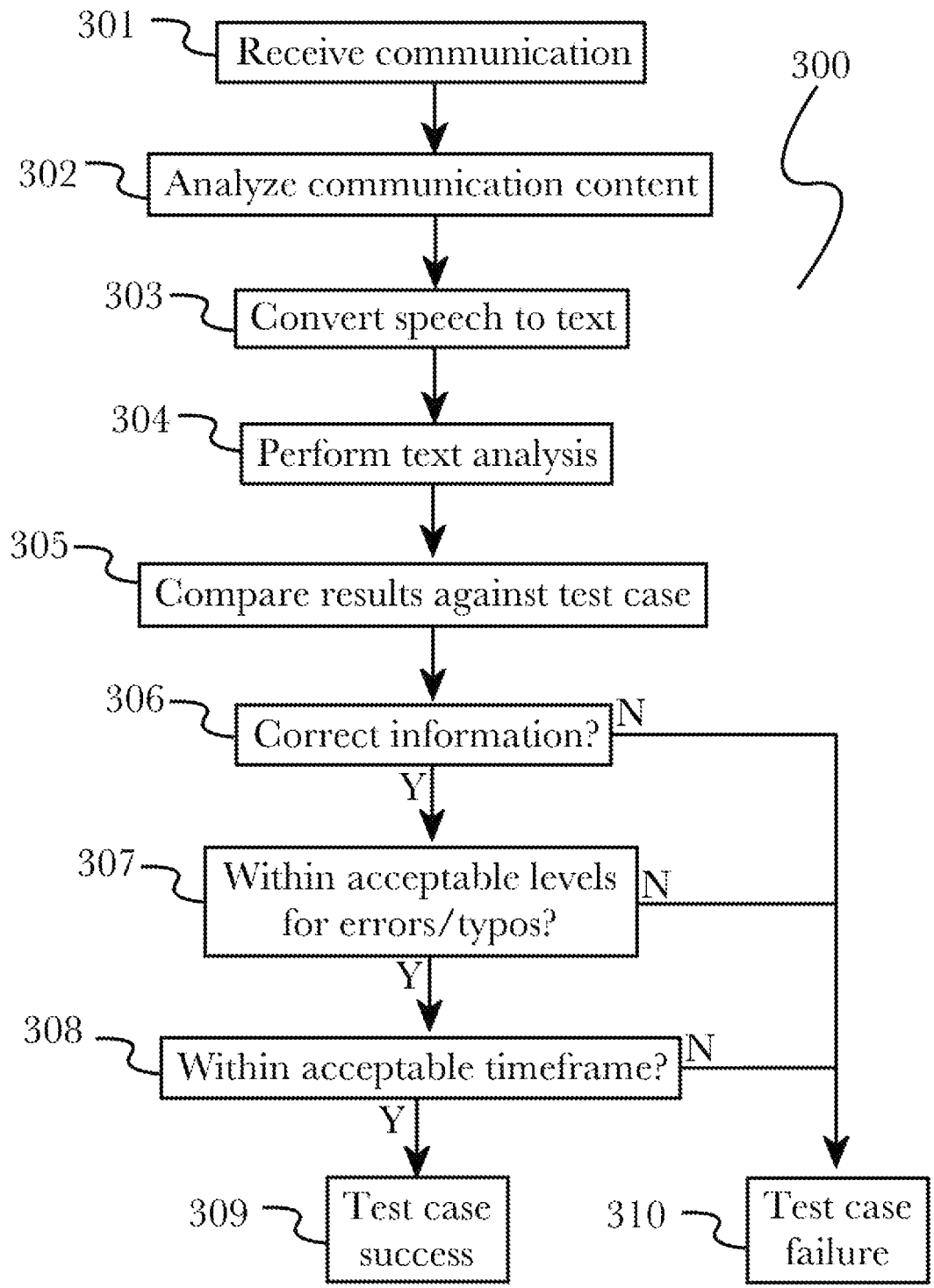
FIG. 3 is a flow diagram illustrating an exemplary method for automated multi-channel customer journey testing, illustrating a process for identifying and handling interaction content variances, according to a preferred embodiment of the invention.

FIG. 3 is a flow diagram illustrating an exemplary method 300 for automated multi-channel customer journey testing, illustrating a process for identifying and handling interaction content variances, according to a preferred embodiment of the invention. According to the embodiment, in a first step 301 a communication may be received at a journey tracking server 114, which may then in a next step 302 analyze the communication's content. A communication may be either inbound or outbound (that is, it may from a customer or from a contact center system or resource, such as a VA program 111a or agent 111b), and any particular communication may be a standalone message or notification or it may be part of a larger conversation or interaction. In this manner, constituent communications of an interaction may be individually analyzed for fine-grained control of a test case, while still retaining the logical connections between them to form interactions and journeys. During analysis of a communication, speech audio may be converted to text 303, and text (including any converted speech, when applicable) may be analyzed 304 to identify topics, keywords or phrases, check spelling and grammar, check for preferred vocabulary (or vocabulary to avoid), or other text analysis operations. The results of analysis may then be compared against a loaded test case configuration 305, to determine whether the test can be considered a success or failure. The analyzed content of the communication may be compared to expected results 306 to determine if any provided information is correct, the analyzed text may be compared against a plurality of acceptability thresholds 307 such as number of typographical errors or number of key vocabulary words or phrases that should be found (or a maximum number of keywords or phrases to be avoided), and the communication timing information may be checked 308 to determine if the communication was produced and delivered within an acceptable timeframe. If all comparisons pass, the test may be considered a success 309, but if any comparison returns a negative result (for example, if the number of typographical errors is above a tolerance threshold, or if the information presented does not match what was expected, as may be the case with a response to a structured query), then the test case is considered a failure 310. In this manner, a variety of analysis and comparison operations, and combinations thereof, may be used to provide flexible pass/fail checking that can accommodate natural language elements such as vocabulary variance and typographical mistakes, without providing false positive or negative results. This may be used to improve testing reliability when dealing with human agents or virtual assistants, allowing automated testing to be used in a wide variety of environments and configurations without compromising results.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
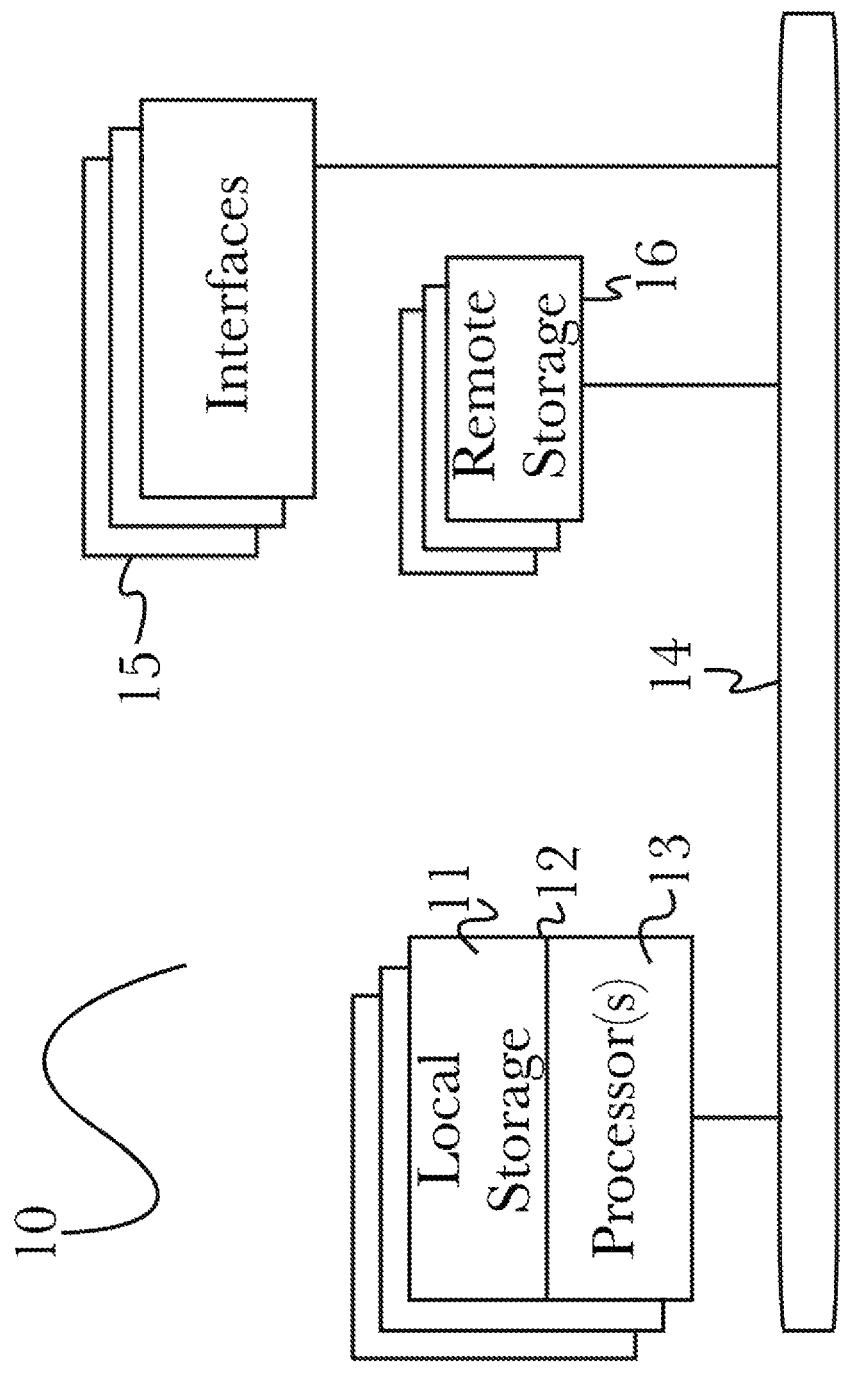
FIG. 4 is a block diagram illustrating an exemplary hardware architecture of a computing device used in an embodiment of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
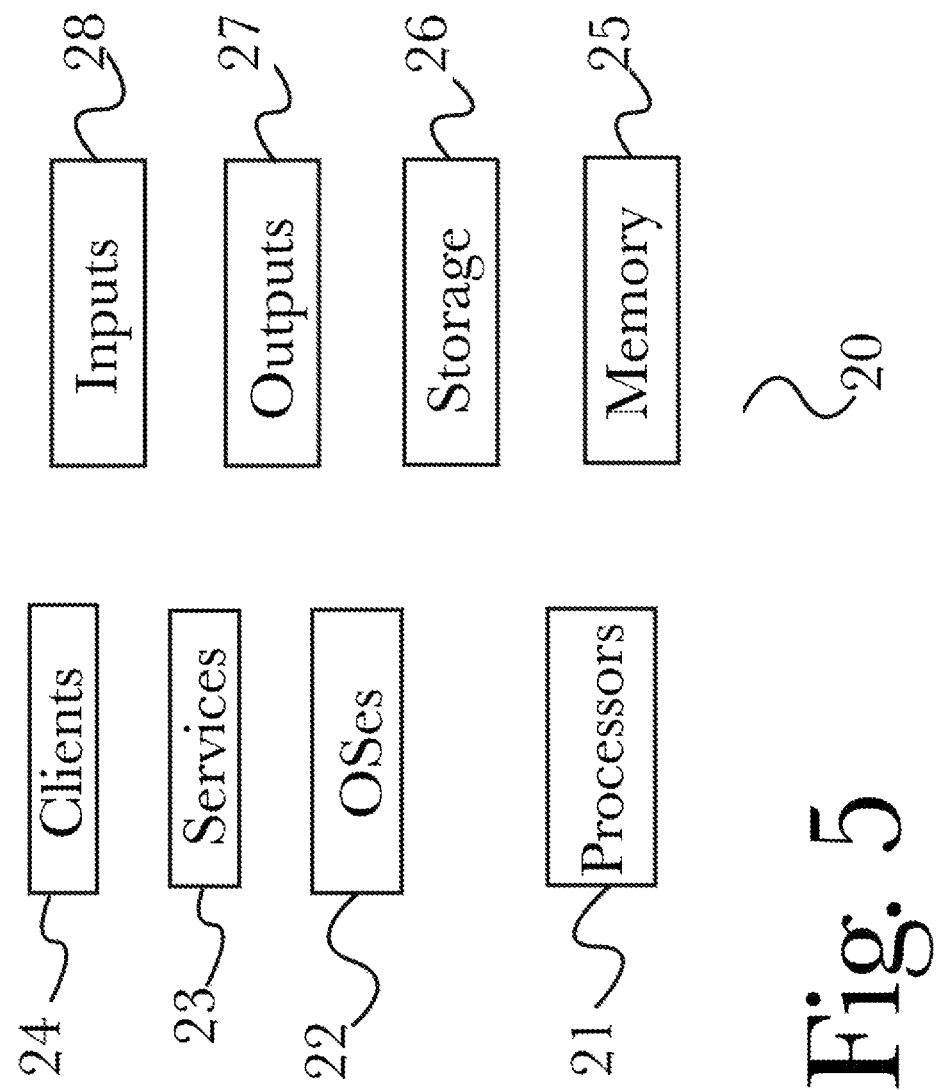
FIG. 5 is a block diagram illustrating an exemplary logical architecture for a client device, according to an embodiment of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
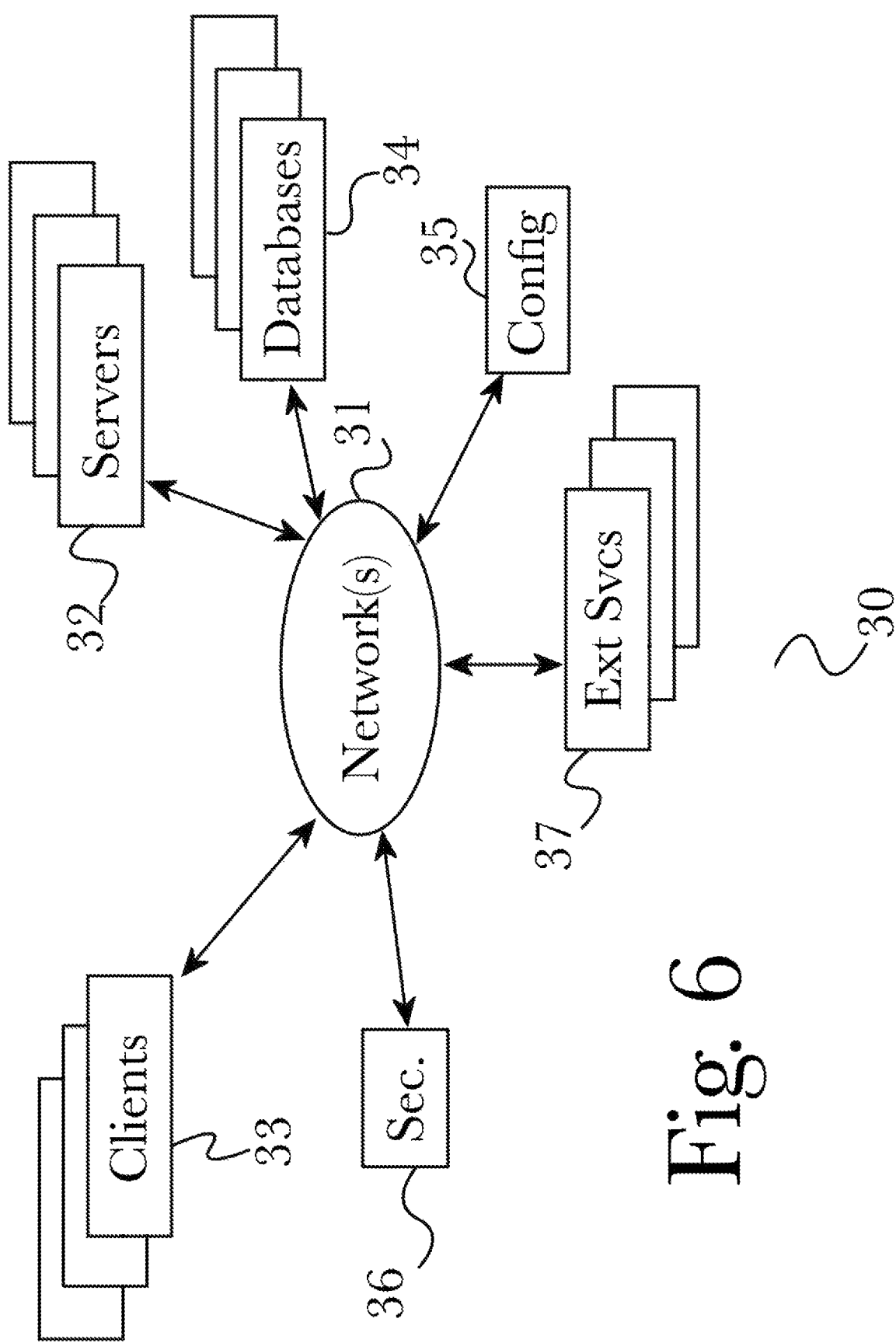
FIG. 6 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
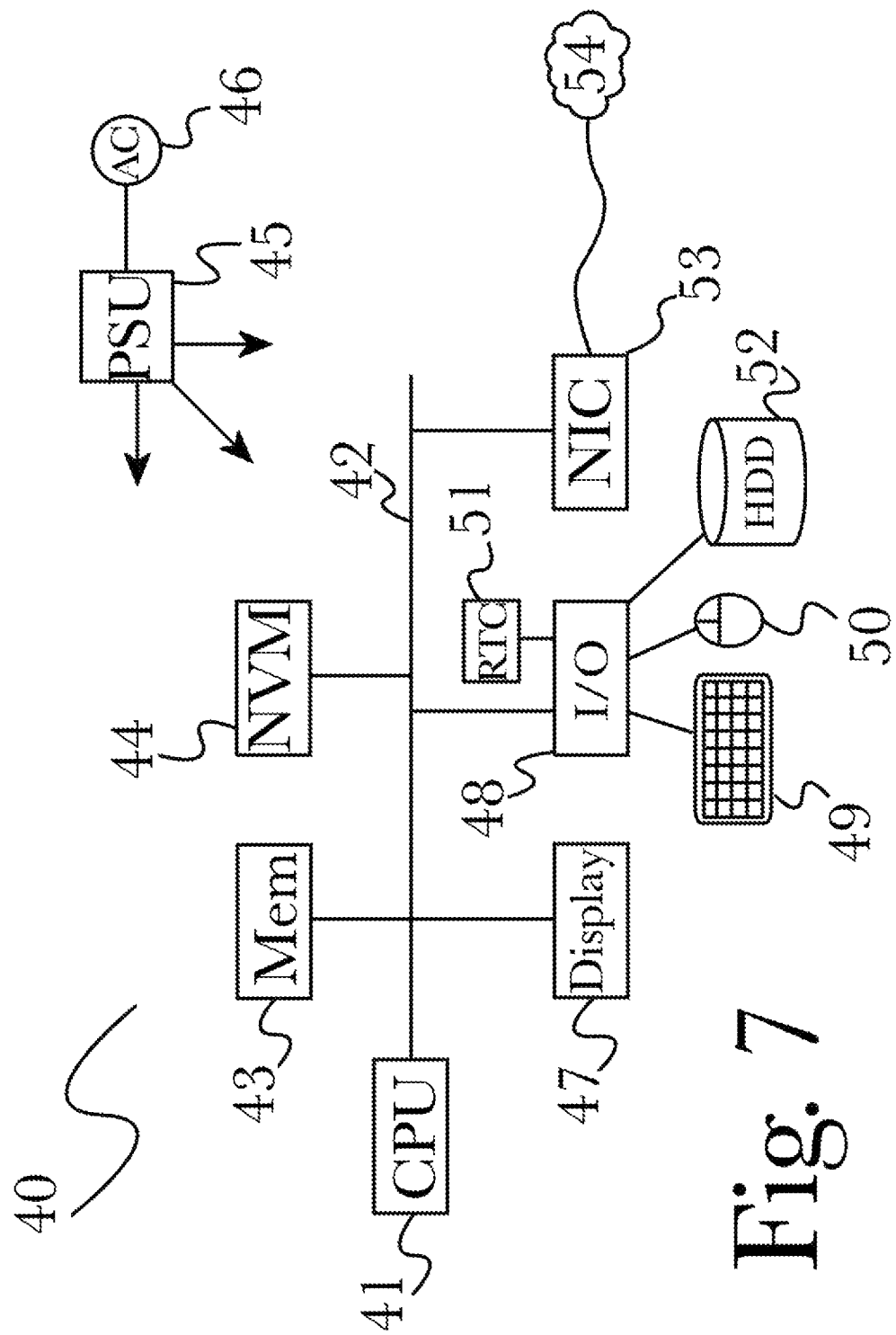
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated multi-channel customer journey testing, comprising:
    a customer relations management database comprising historical customer interaction information about previous interactions customers and businesses, and communication channels through which those interactions occurred;
    a customer journey tracking server comprising at least a processor, a memory, and a plurality of programming instructions stored in the memory and operating on the processor, wherein the programming instructions, when operating on the processor, cause the processor to:
    retrieve historical customer interaction information stored in the customer relations management database, wherein the historical customer interaction information comprises a plurality of interactions with a customer over time occurring across a plurality of different communication channels;
    analyze the historical customer interaction information to identify connections between a set of interactions of the plurality of interactions wherein each interaction of the set of interactions is associated with a communication channel and the set of interactions is associated with at least two different communication channels; and
    connect the set of interactions with identified connections to form a logical journey of interactions for the customer, the logical journey comprising a single, larger interaction encompassing the set of interactions with the customer; and
    a customer journey test management server comprising at least a processor, a memory, and a plurality of programming instructions stored in the memory and operating on the processor, wherein the programming instructions, when operating on the processor, cause the processor to:
    receive the logical journey of interactions;
    retrieve a test case from a test database comprising a plurality of test cases and test execution configuration wherein the test case and test execution configuration are configured to test the logical journey of interactions for correctness of information within the logical journey of interactions;
    establish a test execution environment based on the test execution configuration of the test case;
    execute the test case, according to the test execution configuration, within the test execution environment by:
        transmitting, according to the test execution configuration, a test message for each interaction of the set of interactions wherein the message is sent along the communication channel associated with that interaction;
        receiving a response to each test message sent, the response being received on the same communication channel along which the test message was sent;
        comparing each test message with its corresponding response to determine whether the information received in response to the test message is correct; and
        identifying interactions of the set of interactions wherein the information received in response to the test message is incorrect.

2. The system of claim 1, wherein the communication channels comprise at least an email server.

3. The system of claim 1, wherein the communication channels comprise at least an SMS gateway.

4. The system of claim 1, wherein the communication channels comprise at least a web server.

5. The system of claim 1, wherein the communication channels comprise at least a CTI server.

6. The system of claim 1, wherein the communication channels comprise at least a telephony network.

7. A method for automated multi-channel customer journey testing, comprising the steps of:
    creating a customer relations management database comprising historical customer interaction information about previous interactions customers and businesses, and communication channels through which those interactions occurred;
    using a customer journey tracking server comprising at least a processor, a memory, and a plurality of programming instructions stored in the memory and operating on the processor to perform the steps of:
    retrieving historical customer interaction information stored in the customer relations management database, wherein the historical customer interaction information comprises a plurality of interactions with a customer over time occurring across a plurality of different communication channels;
    analyzing the historical customer interaction information to identify connections between a set of interactions of the plurality of interactions wherein each interaction of the set of interactions is associated with a communication channel and the set of interactions is associated with at least two different communication channels; and
    connecting the set of interactions with identified connections to form a logical journey of interactions for the customer, the logical journey comprising a single, larger interaction encompassing the set of interactions with the customer; and
    using a customer journey test management server comprising at least a processor, a memory, and a plurality of programming instructions stored in the memory and operating on the processor to perform the steps of:
    receive to perform the steps of the logical journey of interactions;
    retrieving a test case from a test database comprising a plurality of test cases and test execution configuration wherein the test case and test execution configuration are configured to test the logical journey of interactions for correctness of information within the logical journey of interactions;

establishing a test execution environment based on the test execution configuration of the test case;

executing the test case, according to the test execution configuration, within the test execution environment by:

transmitting, according to the test execution configuration, a test message for each interaction of the set of interactions wherein the message is sent along the communication channel associated with that interaction;

receiving a response to each test message sent, the response being received on the same communication channel along which the test message was sent;

comparing each test message with its corresponding response to determine whether the information received in response to the test message is correct; and identifying interactions of the set of interactions wherein the information received in response to the test message is incorrect.

8. The method of claim 7, wherein the analysis comprises at least performing speech-to-text conversion on audio content in the communication message.

9. The method of claim 7, wherein the communication channels comprise at least a telephony network.

\* \* \* \* \*